United States Patent
Yoon et al.

(10) Patent No.: US 8,713,748 B2
(45) Date of Patent: May 6, 2014

(54) AUTONOMOUS MOBILE CLEANER AND METHOD FOR MOVING THE SAME

(71) Applicant: LG Electronics Inc., Seoul (KR)

(72) Inventors: Sangho Yoon, Seoul (KR); Jaehark Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/771,916

(22) Filed: Feb. 20, 2013

(65) Prior Publication Data

US 2013/0212829 A1     Aug. 22, 2013

(30) Foreign Application Priority Data

Feb. 21, 2012   (KR) .......................... 10-2012-0017553

(51) Int. Cl.
*A47L 5/36* (2006.01)
*A47L 9/28* (2006.01)

(52) U.S. Cl.
USPC ............................. 15/319; 15/339; 15/340.1

(58) Field of Classification Search
USPC ......................................... 15/319, 339, 340.1
IPC .................................................. A47L 5/36,9/28
See application file for complete search history.

(56) References Cited

U.S. PATENT DOCUMENTS 7,043,794 B2 *   5/2006   Conner et al. ............... 15/340.2

FOREIGN PATENT DOCUMENTS

JP          02209017      *   8/1990
JP          H0492634 A        3/1992

* cited by examiner

*Primary Examiner* — David Redding
(74) *Attorney, Agent, or Firm* — McKenna Long & Aldridge, LLP

(57) ABSTRACT

Disclosed are an autonomous mobile cleaner, and a method for moving the same. A user's intention may be estimated based on a size and a direction of a tensile strength applied to the air pipe, and a cleaner body may move according to the user's intention. This can allow the cleaner to autonomously move. Besides, the autonomous mobile cleaner can always and precisely detect a user's operation without having interference with obstacles, using a displacement of the air pipe. Further, the fabrication costs can be reduced and displacements in all directions can be calculated, by using a hall sensor and a magnet member. Further, a user's efforts to operate the cleaner can be minimized, and can be prevented damages of the air pipe, a connection part between the air pipe and the cleaner body, etc. due to an excessive force.

18 Claims, 5 Drawing Sheets

AUTONOMOUS MOBILE CLEANER AND METHOD FOR MOVING THE SAME

CROSS-REFERENCE TO RELATED APPLICATION

Pursuant to 35 U.S.C. §119(a), this application claims the benefit of earlier filing date and right of priority to Korean Application No. 10-2012-0017553, filed on Feb. 21, 2012, the contents of which is incorporated by reference herein in its entirety.

BACKGROUND OF THE INVENTION

1. Field of the Invention

The present disclosure relates to an autonomous mobile cleaner, and particularly, to an autonomous mobile cleaner capable of autonomously moving by estimating a user's operation intention, and a method for moving the same.

2. Background of the Invention

Generally, a cleaner such as a vacuum cleaner and a steam cleaner is an apparatus for sucking air including foreign materials such as dust using a suction motor installed in a body, then removing the foreign materials using a filter, etc. in the body, and then discharging the filtered air to the outside. Such cleaner may be categorized into a canister type where a suction nozzle for sucking dust is separately provided from a body to thus be connected to a connection device, and an upright type where a suction nozzle is rotatably connected to a body.

Generally, the cleaner comprises a cleaner body having a suction body, a suction nozzle configured to suck foreign material-included air disposed on the floor, and an air pipe configured to guide air sucked into the suction nozzle to the cleaner body. The cleaner body moves along the suction nozzle while the suction nozzle is moved by a user.

In order to move the cleaner, the user should have a force corresponding to a frictional force of the cleaner body with respect to the floor. This may cause a difficulty in moving the cleaner. That is, the user should directly move the cleaner body or should move the cleaner by pulling the air pipe, because a power system for autonomous movement of the cleaner is not provided at the cleaner body. In case of moving the cleaner by pulling the air pipe, a connection part between the cleaner body and the air pipe may be damaged.

As disclosed in a prior patent document 1(Korean Application No. 10-2009-0000568), the conventional autonomous mobile cleaner has been devised to be provided with ultrasonic sensors at a foreign-material suction opening and a cleaner body, respectively. However, the conventional art may have the following is problems. If there is an obstacle between an ultrasonic transmitter and an ultrasonic receiver, it is impossible to receive ultrasonic waves. Especially, in this case, the ultrasonic transmitter and the ultrasonic receiver may be blocked by a user. Further, when being used in a complicated indoor room, the conventional autonomous mobile cleaner may mal-function.

SUMMARY OF THE INVENTION

Therefore, an aspect of the detailed description is to provide an autonomous mobile cleaner capable of moving a cleaner body by estimating a user's operation intention before the cleaner body is moved by the user, and a method for moving the same.

To achieve these and other advantages and in accordance with the purpose of this specification, as embodied and broadly described herein, there is provided an autonomous mobile cleaner, comprising: a cleaner body; a suction unit having a handle, and configured to suck foreign materials thereinto; an air pipe configured to connect the cleaner body and the suction unit to each other, and configured to guide the foreign materials into the cleaner body; a sensing unit provided at a connection part between the air pipe and the cleaner body, and configured to output a sensing signal by sensing a size and a direction of a tensile strength applied to the air pipe; and a control unit configured to move the cleaner body using the sensing signal.

According to another embodiment of the present invention, there is provided an autonomous mobile cleaner, comprising: a cleaner body having a connection pipe at one side thereof, and having driving wheels at a lower part is thereof; a suction unit having a handle, and configured to suck foreign materials thereinto; an air pipe connected to the connection pipe, and configured to guide the foreign materials into the cleaner body; a sensing unit configured to output a sensing signal by sensing a size and a direction of a tensile strength applied to the air pipe, and comprised of a hall sensor installed in the connection pipe, and a magnet member installed in the air pipe to correspond to the hall sensor; a control unit configured to calculate a displacement of the air pipe based on the sensing signal, and configured to generate a driving signal based on the calculated displacement; and a driving unit configured to operate the driving wheels based on the driving signal.

To achieve these and other advantages and in accordance with the purpose of this specification, as embodied and broadly described herein, there is also provided a method for moving an autonomous mobile cleaner, in an autonomous mobile cleaner comprising a sensing unit comprised of a hall sensor installed at a connection pipe provided at one side of a cleaner body, and a magnet member installed at an air pipe to correspond to the hall sensor, the method comprising: sensing, by the hall sensor, a size and a direction of a tensile strength applied to the air pipe; calculating a displacement of the air pipe based on the size and the direction of the tensile strength; and moving the cleaner body based on the calculated displacement.

The present invention may have the following advantages.

Firstly, a user's intention may be estimated based on a size and a direction of a tensile strength applied to the air pipe, and the cleaner body may move according to the user's intention. This can allow the cleaner to autonomously move.

Secondly, the autonomous mobile cleaner can always and precisely detect a user's operation without having interference with obstacles, using a displacement of the air pipe. Further, the fabrication costs can be reduced and displacements in all directions can be calculated, by using the hall sensors and the magnet members.

Thirdly, the distance between the cleaner body and a user can be constantly maintained by estimating the user's intention. This can minimize the user's efforts to operate the cleaner, and can prevent damages of the air pipe, a connection part between the cleaner body and the air pipe, etc. due to an excessive force.

Fourthly, a user can move the mobile cleaner with a less force. This can enhance the user's convenience and stability of the product. Besides, the mobile cleaner can be applied to not only a vacuum cleaner, but also a steam cleaner, a manual forklift, etc., using the hall sensor and the magnet member.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this is specification, illustrate exemplary embodiments and together with the description serve to explain the principles of the invention.

In the drawings.

DETAILED DESCRIPTION OF THE INVENTION

Figure 1:
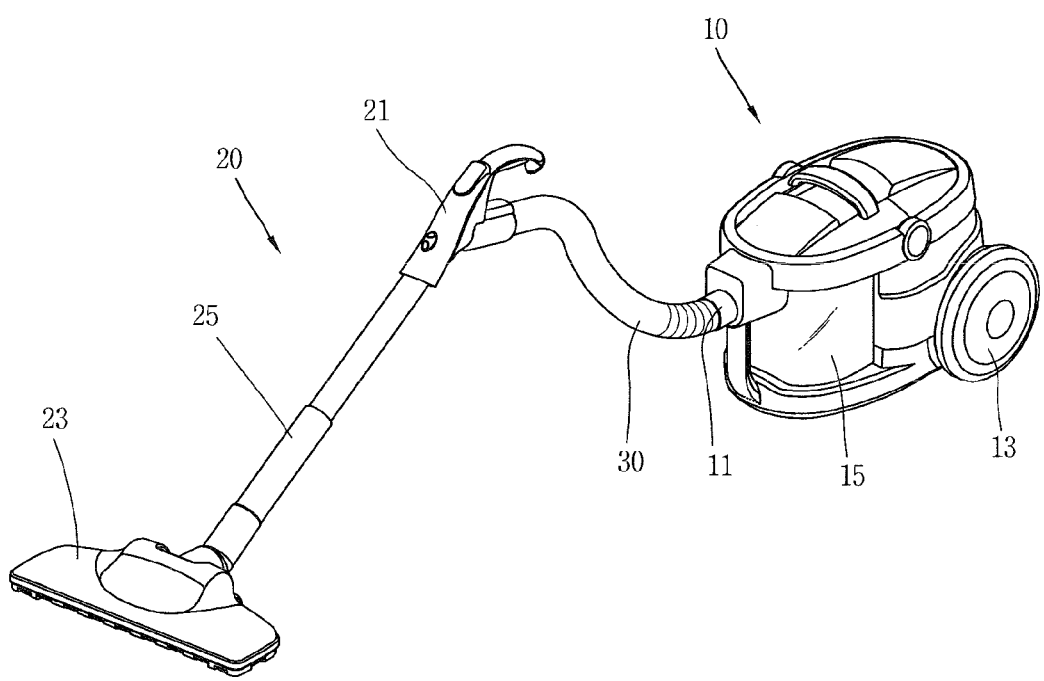
FIG. 1 is a perspective view of an autonomous mobile cleaner according to a preferred embodiment of the present invention.
Figure 2:
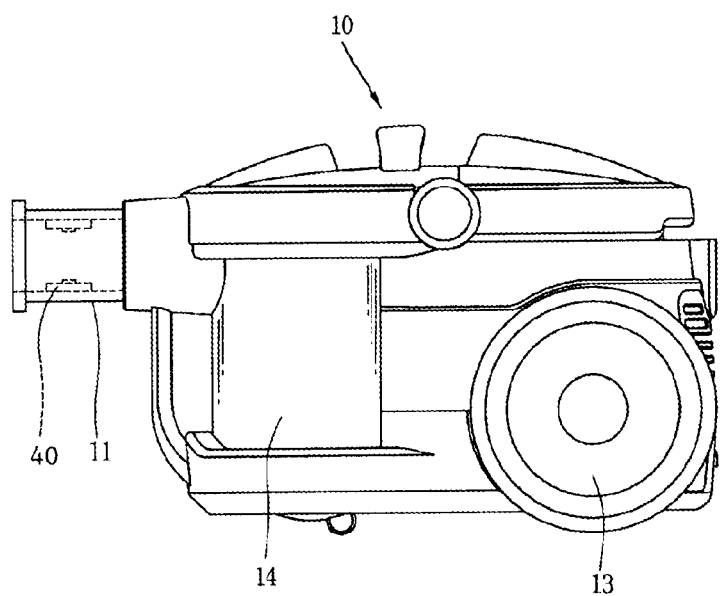
FIG. 2 is a side sectional view of a cleaner body of an autonomous mobile cleaner according to a preferred embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

Referring to FIGS. 1 to 5, an autonomous mobile cleaner according to an embodiment of the present invention comprises: a cleaner body 10; a suction unit 20 having a handle, and configured to suck foreign materials thereinto; an air pipe 30 configured to connect the cleaner body 10 and the suction unit 20 to each other, and configured to guide the foreign materials into the cleaner body 10; a sensing unit 40 provided at a connection part between the air pipe 30 and the cleaner body 10, and configured to output a sensing signal by sensing a size and a direction of a tensile strength applied to the air pipe; and a control unit 50 configured to move the cleaner body 10 based on the sensing signal.

The autonomous mobile cleaner further comprises a driving wheel 13 installed at a lower part of the cleaner body 10, and configured to move the cleaner body 10. The autonomous mobile cleaner further comprises a driving unit 60 having a driving motor, and configured to operate the driving wheel by operating the driving motor based on a driving signal. The autonomous mobile cleaner may further comprise an auxiliary wheel not driven by the driving motor, but rotating in a supplementary manner to the driving wheel.

The control unit 50 includes a displacement calculator 51 configured to calculate a displacement of the air pipe using the sensing signal of the sensing unit 40, and a driving signal generator 53 configured to generate a driving signal based on the calculated displacement. Here, the driving signal indicates a signal for forward or backward moving the cleaner body 10, or a signal for rotating or stopping the cleaner body 10.

The control unit 50 controls the distance between a user and the cleaner body 10 to be within a prescribed value, based on the calculated displacement. The prescribed value may be preset. For instance, the prescribed value may be set as a prescribed percentage of the length of the air pipe. The driving wheel 13 mounted to the cleaner body 10 is driven by the driving unit 60.

More specifically, the control unit calculates a displacement for maintaining a constant distance between the user and the cleaner body, based on the sensing signal generated from the sensing unit. Then, the driving motor drives driving wheels 13a and 13b based on the calculated displacement. The respective driving wheels 13a and 13b are independently driven, so that the autonomous mobile cleaner can move straight and rotate, and can have a constant distance from the user. Here, the number and arrangement of the driving wheels may be variable according to situations.

The cleaner body 10 may include a dust collecting device 15 mounted thereto in a detachable manner. The dust collecting device 15 may be called 'dust separating device'. Generally, the dust collecting device 15 is detachably mounted to the front side of the cleaner body 10. Various types of filters may be detachably coupled to the dust collecting device 15. As a suction motor rotates, a suction force is generated. Air sucked into the autonomous mobile cleaner by the generated suction force has dust separated therefrom, while passing through the dust collecting device 15. The separated dust is stored in the dust collecting device 15.

The suction unit 20 includes a handle 21 with which a user can operate the autonomous mobile cleaner. The suction unit 20 further includes a suction head 23 disposed on the floor so as to suck foreign materials and air. A suction opening through which air and foreign materials such as dust existing on the floor, is formed on the bottom surface of the suction head. An agitator configured to induce foreign materials such as dust into the suction opening, is rotatably formed at the suction opening. The suction opening 20 may further include an extension pipe 25 which connects the handle 21 and the suction head 23 to each other.

The air pipe 30 may have a bellows form, and may be formed of synthetic resin, etc. One side of the air pipe 30 is connected to the suction unit 20, and another side thereof is connected to the cleaner body 10, i.e., the connection pipe 11.

Figure 3:
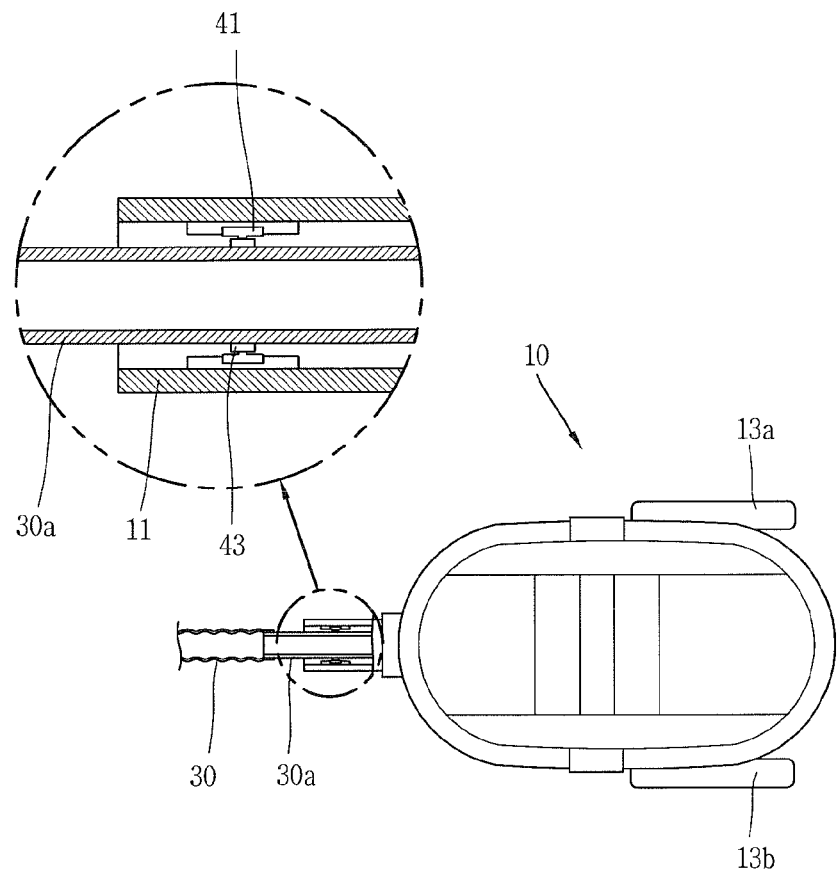
FIG. 3 is a view showing a coupled state between an air pipe and a cleaner body in an autonomous mobile cleaner according to a preferred embodiment of the present invention.

Referring to FIG. 3, the cleaner body 10 may include the connection pipe 11 at one side thereof, so that the air pipe 30 can be connected to the connection pipe 11. As shown in FIG. 3, the sensing unit 40 includes a hall sensor 41 installed at the connection pipe 11, and a magnet member 43 installed at the air pipe 30a to correspond to the hall sensor 41. For examples, the magnet member 43 is installed at the air pipe 30a to directly face the hall sensor 41.

As shown in FIG. 3, the connection pipe 11 has a cylindrical shape like the air pipe 30, and may be configured in various manners to maintain a constant distance from the air pipe 30. The connection pipe 11 may be formed of aluminum, synthetic resin, etc.

Figure 4:
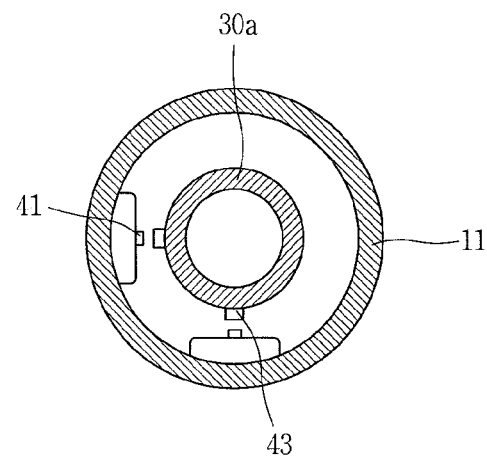
FIG. 4 is a view showing a coupled state of sensors of FIG. 3.
Figure 5:
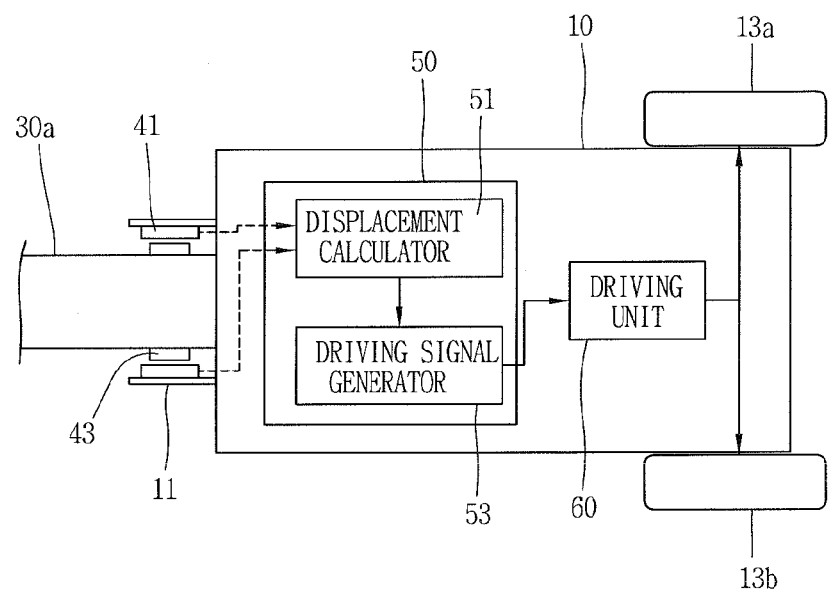
FIG. 5 is a block diagram showing an operation to determine a user's intention according to a preferred embodiment of the present invention.

Referring to FIG. 4, the hall sensor 41 is formed in two, and the two hall sensors are installed in the connection pipe 11 in directions perpendicular to each other. The number of the hall sensor may be one or at least two, and the arrangement of the hall sensor may be variable according to a displacement measuring method by the control unit.

Referring to FIGS. 1 to 5 back, an autonomous mobile cleaner according to another embodiment of the present invention comprises a cleaner body 10, a suction unit 20, an air pipe 30, a sensing unit 40, a control unit 50, and a driving unit 60.

The cleaner body 10 is provided with a connection pipe 11 at one side thereof, and a driving wheel 13 is installed at a lower part of the cleaner body 10. The suction unit 20 is provided with a handle 21, and is configured to suck foreign materials. The air pipe 30 is connected to the connection pipe 11, and is configured to guide foreign materials to the cleaner body 10. The sensing unit 40 includes a hall sensor 41 installed in the connection pipe 11, and a magnet member 43 installed in the air pipe 30 to correspond to the hall sensor 41. The sensing unit 40 is configured to sense a size and a direction of a tensile strength applied to the air pipe 30. The control unit 50 calculates a displacement of the air pipe 30 based on the sensing signal, and generates a driving signal based on the calculated displacement. The driving unit 60 operates the driving wheel 13 based on the driving signal.

Explanations about the same contents as the aforementioned contents in one preferred embodiment will be omitted.

Referring to FIG. 4, the hall sensor 41 is installed in a direction perpendicular to the connection pipe 11, and a magnet member is attached to the air pipe 30 to correspond to the hall sensor. The sensing unit 40 may be configured to estimate a user's operation intention back and forth and right and left, through the movement of the air pipe 30.

As shown in FIG. 4, the autonomous mobile cleaner according to preferred embodiments of the present invention senses the movement of the air pipe 30 using the hall sensors 41 and the magnet members 43, and performs displacement conversion and operation estimation based on the sensed movement. The control unit sets an operation amount of each driving wheel, and the driving unit operates the right and left wheels using the driving motor. The autonomous mobile cleaner may maintain a constant interval between the cleaner body and a user.

Figure 6:
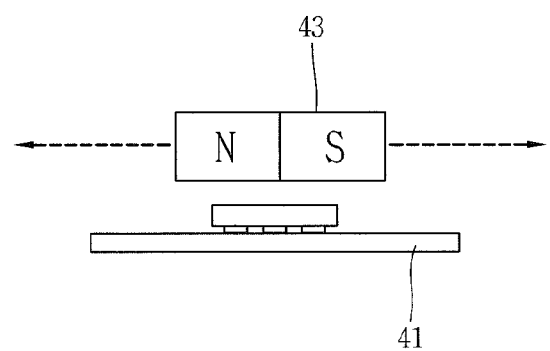
FIG. 6 is a view showing a sensing unit according to a preferred embodiment of the present invention.

As the hall sensor 41, may be used a linear hall sensor of FIG. 6, or a 3D hall sensor, etc. Referring to FIG. 6, the linear hall sensor is configured to generate a sensing signal (result value) according to a moving distance of a magnet member (permanent magnet) above a sensor. In the case of the linear hall sensor, it operates at a temperature of −30~85, and measures a moving distance (0.5~2 mm) of the permanent magnet spaced from the linear hall sensor by 1 mm, with resolution of 10-bit. Under such principle, the movement amount of the air pipe around the hall sensors can be precisely measured, by permanent magnets installed at the air pipe 30.

Figure 7:
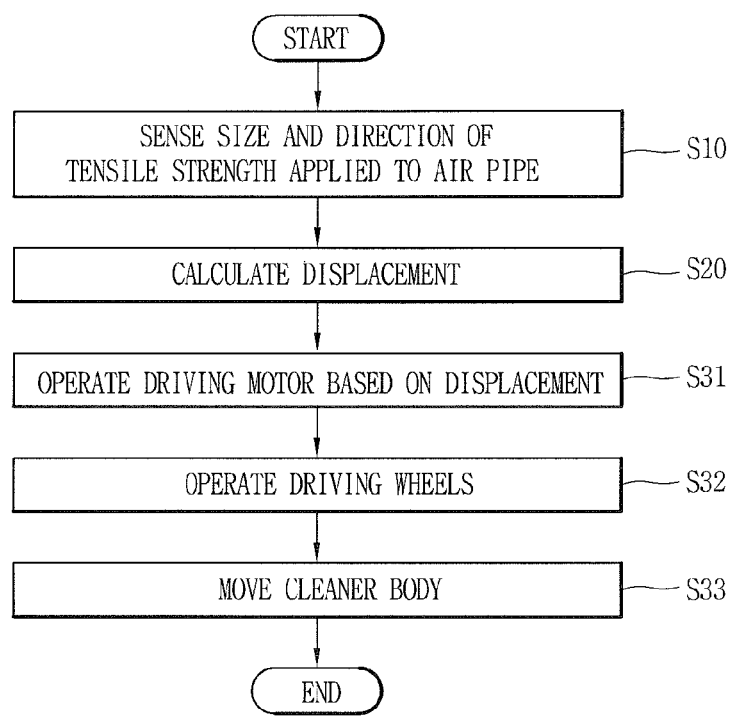
FIG. 7 is a flowchart schematically showing a method for moving an autonomous mobile cleaner according to a preferred embodiment of the present invention.

Referring to FIG. 7, a method for moving an autonomous mobile cleaner according to one embodiment of the present invention comprises: sensing, by a hall sensor, a size and a direction of a tensile strength applied to an air pipe (S10), calculating a displacement of the air pipe based on the size and the direction of the tensile strength (S20), and moving a cleaner body based on the calculated displacement (S30). The autonomous mobile cleaner has the configuration of FIGS. 1 to 6. That is, the autonomous mobile cleaner comprises a sensing unit comprised of a hall sensor installed at a connection pipe provided at one side of the cleaner body, and a magnet member installed at an air pipe to correspond to the hall sensor.

The step of moving the cleaner body (S30) includes operating a driving motor provided in the cleaner body based on the calculated displacement (S31), and operating a driving wheel installed at a lower part of the cleaner body by the driving motor (S32). The step of moving the cleaner body (S30) is a step of is forward or backward moving the cleaner body, or rotating or stopping the cleaner body.

The autonomous mobile cleaner senses the movement of the air pipe using the hall sensor and the magnet member (S10), and performs displacement conversion and operation estimation based on the sensed movement (S20). The autonomous mobile cleaner determines an operation amount of each driving wheel (S31), and operates the right and left wheels using the driving motor (S32). The autonomous mobile cleaner maintains a constant interval between the cleaner body and a user, based on the calculated displacement. The prescribed value may be preset. For instance, the prescribed value may be set as a prescribed percentage of the length of the air pipe. More specifically, the autonomous mobile cleaner calculates a displacement for maintaining a constant distance between the user and the cleaner body, based on a sensing signal generated from the hall sensor and the magnet member. Then, the driving motor drives the driving wheels based on the calculated displacement. The respective driving wheels are independently driven, so that the autonomous mobile cleaner can move straight and rotate, and can have a constant distance from the user.

The autonomous mobile cleaner and the method for moving the same according to the present invention can have the following advantages.

Firstly, a user's intention is estimated by using a size and a direction of a tensile strength applied to the air pipe. Under such configuration, the autonomous mobile cleaner can autonomously move.

Secondly, the autonomous mobile cleaner can always and precisely detect a user's operation without having interference with obstacles, using a displacement of the air pipe. Further, the fabrication costs can be reduced and displacements in all directions can be calculated, by using the hall sensors and the magnet members.

Thirdly, the distance between the cleaner body and a user can be constantly maintained by estimating the user's intention. This can minimize the user's efforts to operate the cleaner, and can prevent damages of the air pipe, a connection part between the cleaner body and the air pipe, etc. due to an excessive force.

Fourthly, a user can move the mobile cleaner with a less force. This can enhance the user's convenience and stability of the product. Besides, the mobile cleaner can be applied to not only a vacuum cleaner, but also a steam cleaner, a manual forklift, etc., using the hall sensor and the magnet member.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or is equivalents of such metes and bounds are therefore intended to be embraced by the appended claims.

What is claimed is:

1. An autonomous mobile cleaner, comprising:
 a cleaner body;

a suction unit having a handle, and configured to suck foreign materials thereinto;

an air pipe configured to connect the cleaner body and the suction unit to each other, and configured to guide the foreign materials into the cleaner body;

a sensing unit provided at a connection part between the air pipe and the cleaner body, and configured to output a sensing signal by sensing a size and a direction of a tensile strength applied to the air pipe; and a control unit configured to move the cleaner body based on the sensing signal, wherein the cleaner body includes a connection pipe at one side thereof, so that the air pipe can be connected to the connection pipe, and wherein the sensing unit includes:

a hall sensor installed in the connection pipe; and a magnet member installed in the air pipe to correspond to the hall sensor.

2. The autonomous mobile cleaner of claim 1, further comprising:

driving wheels installed at a lower part of the cleaner body, and configured to move the cleaner body; and a driving unit having a driving motor, and configured to operate the driving wheels by operating the driving motor based on a driving signal.

3. The autonomous mobile cleaner of claim 2, wherein the control unit is configured to calculate a displacement of the air pipe based on the sensing signal, and to generate the driving signal based on the calculated displacement.

4. The autonomous mobile cleaner of claim 3, wherein the driving signal indicates a signal for forward or backward moving the cleaner body, or a signal for rotating or stopping the cleaner body.

5. The autonomous mobile cleaner of claim 4, wherein the control unit controls a distance between a user and the cleaner body to be within a prescribed value, based on the calculated displacement.

6. The autonomous mobile cleaner of claim 1, wherein the hall sensor is formed in two, and the two hall sensors are installed in the connection pipe in directions perpendicular to each other.

7. An autonomous mobile cleaner, comprising:

a cleaner body having a connection pipe at one side thereof, and having driving wheels at a lower part thereof;

a suction unit having a handle, and configured to suck foreign materials thereinto;

an air pipe connected to the connection pipe, and configured to guide the foreign materials into the cleaner body;

a sensing unit configured to output a sensing signal by sensing a size and a direction of a tensile strength applied to the air pipe, and comprised of a hall sensor installed in the connection pipe, and a magnet member installed in the air pipe to correspond to the hall sensor;

a control unit configured to calculate a displacement of the air pipe using the sensing signal, and configured to generate a driving signal based on the calculated displacement; and a driving unit configured to operate the driving wheels based on the driving signal.

8. The autonomous mobile cleaner of claim 7, wherein the control unit controls a distance between a user and the cleaner body to be within a prescribed value, by forward or backward moving the cleaner body, or by rotating or stopping the cleaner body.

9. The autonomous mobile cleaner of claim 7, wherein the hall sensor is formed in two, and the two hall sensors are installed in the connection pipe in directions perpendicular to each other.

10. A method for moving an autonomous mobile cleaner, in an autonomous mobile cleaner comprising a sensing unit comprised of a hall sensor installed at a connection pipe provided at one side of a cleaner body, and a magnet member installed at an air pipe to correspond to the hall sensor, the method comprising:

sensing, by the hall sensor, a size and a direction of a tensile strength applied to the air pipe;

calculating a displacement of the air pipe based on the size and the direction of the tensile strength; and moving the cleaner body based on the calculated displacement.

11. The method of claim 10, wherein the step of moving the cleaner body includes:

operating a driving motor provided in the cleaner body based on the calculated displacement; and operating driving wheels installed at a lower part of the cleaner body by the driving motor.

12. The method of claim 10, wherein the step of moving the cleaner body is a step of forward or backward moving the cleaner body, or rotating or stopping the cleaner body.

13. The autonomous mobile cleaner of one of claim 2, wherein the cleaner body includes a connection pipe at one side thereof, so that the air pipe can be connected to the connection pipe.

14. The autonomous mobile cleaner of one of claim 3, wherein the cleaner body includes a connection pipe at one side thereof, so that the air pipe can be connected to the connection pipe.

15. The autonomous mobile cleaner of one of claim 4, wherein the cleaner body includes a connection pipe at one side thereof, so that the air pipe can be connected to the connection pipe.

16. The autonomous mobile cleaner of one of claim 5, wherein the cleaner body includes a connection pipe at one side thereof, so that the air pipe can be connected to the connection pipe.

17. The autonomous mobile cleaner of claim 8, wherein the hall sensor is formed in two, and the two hall sensors are installed in the connection pipe in directions perpendicular to each other.

18. The method of claim 11, wherein the step of moving the cleaner body is a step of forward or backward moving the cleaner body, or rotating or stopping the cleaner body.

* * * * *